United States Patent Office 2,999,759
Patented Sept. 12, 1961

2,999,759
MAGNESIA BRICK

Russell Pearce Heuer, Bryn Mawr, Pa., assignor to General Refractories Company, a corporation of Pennsylvania
No Drawing. Filed Aug. 14, 1959, Ser. No. 833,673
4 Claims. (Cl. 106—58)

The present invention relates to refractory brick which includes as an essential ingredient calcined magnesia.

A purpose of the invention is to avoid or minimize the tendency to form cracks in magnesia-bearing refractory bricks after the ground refractory material has been moistened with water, formed into brick, and then dried to remove the water.

A further purpose is to avoid the crack-forming tendency of unascertained cause which exists in certain types of dead-burned magnesite or so-called magnesia, especially Greek magnesite and to some extent magnesia from sea water.

A further purpose is to introduce into the refractory mix prior to molding a boron compound, preferably a boron oxide compound and most desirably boric acid, which will be present in the moistened refractory mixture during molding and will remain in the brick after the molded brick has been dried and thus will protect against cracking in the dried brick.

Further purposes appear in the specification and in the claims.

Calcined magnesia finds wide use in the manufacture of refractory bricks and an entire class of basic refractory bricks is based upon magnesia used alone or with other ingredients.

The magnesia is usually prepared by calcining natural magnesium carbonate, usually called magnesite or brucite, or by calcining magnesium hydroxide which is prepared from sea water or from brine containing a soluble magnesium salt.

The refractory magnesia is usually calcined at a temperature exceeding 1500° C. and is commonly referred to as dead-burned magnesia to distinguish it from the so-called caustic burned magnesia which is calcined at a lower temperature and is more reactive commonly, especially with water, with which it combines to form magnesium hydroxide.

The following table gives typical analyses for different types of dead-burned magnesia, the percentages as well as all other percentages herein being by weight:

|  | Sea water magnesia, percent | Calcined Austrian magnesite, percent | Calcined Greek magnesite, percent |
|---|---|---|---|
| L.O.I. | 0.10 | 0.64 | 0.58 |
| $SiO_2$ | 5.31 | 0.34 | 3.09 |
| $Fe_2O_3$ | 0.34 | 6.16 | 0.08 |
| $Al_2O_3$ | 0.50 | 0.47 | 0.41 |
| CaO | 1.05 | 2.59 | 1.45 |
| MgO (by diff.) | 92.70 | 89.80 | 94.39 |
| Bulk density | 3.14 | 3.23 | 3.33 |

The dead-burned magnesia is crushed, ground and screened to form a suitable component of the refractory mix which makes up the brick.

In some cases the refractory content of the refractory brick will be entirely calcined magnesia. In other cases the refractory content of the refractory brick will consist of at least 15% of magnesia mixed with refractory chrome ore particles, typical magnesia contents being between 35 and 60%. In some cases the magnesia particles will be mixed with from 5 to 75% of olivine particles. In other cases the magnesia particles will be mixed with from 1 to 25% of alumina particles. Other suitable ingredients can be used with magnesia as desired, the ones most frequently encountered being minerals which are of the general character mentioned above, such as minerals high in alumina.

In making up the refractory mixtures, it is usual to employ coarser particles which rest on a screen of 28 mesh per linear inch and will suitably pass through a screen of 3 mesh per linear inch. These coarser particles make up from 40 to 90% by weight of the refractory particles.

In addition to the coarser particles, finer particles are used which pass through a screen of 48 mesh per linear inch, and which make up from 10 to 60% by weight of the refractory mix. Intermediate sized particles between 28 and 48 mesh per linear inch are preferably eliminated or maintained unnaturally low.

Where mesh sizes are referred to herein, it is intended to refer to Tyler standard mesh per linear inch.

As in normal practice the refractory mix has incorporated in it sufficient water to aid in molding, the amount of water depending upon the particular mixture being usually of the order of 3 to 4% on the weight of the dry ingredients. Mixing is suitably accomplished in a wet pan or mixer.

As well known, in addition to the refractory mix and the water, it is usual to incorporate a bonding agent if the brick are to be used without kiln firing. Such bonding agents will commonly be sulphuric acid, lignin waste, or another organic adhesive, such as starch or gum arabic. The quantity of bonding agent on the weight of the dry ingredients will suitably be of the order of 1% and may in a particular case be as much as 3%. The moistened mixture is formed into brick under a suitable molding pressure, which may be of the order of 5000 to 20,000 p.s.i or higher.

After molding the brick are dried to remove the added moisture, suitable drying temperatures being between 150 and 300° F.

In the prior art, cracks were frequently developed during this drying process or subsequent to drying. The cause of this cracking has not been definitely established but it is believed that it is connected with the fact that certain dead-burned magnesia has the property of combining with water to form magnesium hydroxide even after calcining at a temperature of 1500° C. or higher, whereas other magesia is resistant to hydration after dead-burning.

The condition has been so serious in the prior art that certain dead-burned magnesia particularly that of Greek origin, cannot be made into refractory bricks free from cracks. In the case of dead-burned magnesia obtained from sea water the tendency to form cracks is less pronounced, while in the case of dead-burned magnesia of Austrian origin, there is a still lower cracking tendency.

The present inventor has discovered that cracking of this type can be eliminated or greatly reduced by introducing a boron compound in the mixture prior to molding the brick. The boron compound is preferably a boron oxide compound, the most desirable material to add being boric acid. Boric anhydride may if desired be used. Calcium borate, magnesium borate and alkaline earth borates generally are suitable. Alkali metal boron compounds are counter-indicated because of the loss in refractoriness.

The quantity of boron compound when calculated as $B_2O_3$ on the weight of the dry refractory mix will be in the range between 0.02 and 0.30% and most desirably about 0.05%. From this information it is evident that the quantity of boron compound required is surprisingly small.

The boron compound is introduced during mixing in the wet pan or mixer, preferably as a powder, although it may be mixed with the water used in tempering if the boron compound is sufficiently soluble.

The mixture is then molded into brick as above described and dried as mentioned above. The brick can be used directly in a metallurgical or other furnace without kiln firing, or can be kiln-fired according to usual practice.

EXAMPLE 1

Chrome free magnesia brick suitable for use without kiln firing

The refractory mix contains 65% by weight of coarse magnesia particles resting on a 28 mesh screen and 35% of fine magnesia particles passing through a 48 mesh screen. The refractory mix is moistened with a dilute solution (220 Bé.) of sulphuric acid until the water content of the mix is of the order of 4%, and 4% by weight of the dry refractory of fine metallic iron powder passing through a 200 mesh screen is introduced to form a ceramic bond at higher temperature. To this mixture boric acid powder passing through a 65 mesh screen is added until the $B_2O_3$ content based upon the dry refractory mixture is 0.05%. The mixture is molded into brick at 10,000 p.s.i. and dried at 230° F. for 18 hours. The recovery of crack-free refractory brick in accordance with the above example when using Greek magnesia is increased from less than 10% to better than 98%. Recoveries better than 98% according to this example are also obtained with magnesia from sea water and with Austrian magnesia.

EXAMPLE 2

Magnesia chrome brick suitable for use without kiln firing

The refractory mix is made up of 30% by weight of coarse magnesia particles resting on a 28 mesh screen and 35% by weight of coarse chromite particles resting on a 28 mesh screen. The refractory mix also includes 35% of finer magnesia particles small enough to pass a 48 mesh screen.

The refractory mix is moistened with dilute sulphuric acid as in Example 1 and 2% on the weight of the dry refractory of finely ground kaolin is added. Boric acid is introduced as in Example 1, and the mixture is pressed and dried as in Example 1.

The recovery of crack-free brick suitable for use without kiln firing using Grecian magnesia, is increased from less than 10% to better than 98%. Recoveries of crack-free brick at least as good as 98% according to this example are obtained with magnesia from sea water and with Austrian magnesia.

EXAMPLE 3

Chrome magnesia brick suitable for use without kiln firing

A refractory mix is made up composed of 65% by weight of coarse chromite particles resting on a 28 mesh screen and 35% of fine magnesia particles passing through a 48 mesh screen. The refractory is moistened with dilute sulphuric acid and 2% of finely ground kaolin is added as in Example 2. Boric acid is added as in Example 1 and the mixture is molded into brick and dried as in Example 1.

In Example 3 the recovery of crack-free brick using Grecian magnesia is increased from less than 10% to better than 98%. With Austrian magnesia and with magnesia from sea water the recoveries of crack-free brick according to the invention are better than 98%.

In each of the above examples calcined magnesia can be used with from 5 to 75% by weight of olivine, with from 1 to 25% of calcined alumina, or with other suitable refractory substances.

Boron compounds, especially boric acid are incorporated as above set forth.

The brick of any of the examples can be kiln fired in the usual manner, and in this case the bonding substance will if desired be employed.

If the effect of the boron compound in reducing cracking is not sufficient, the amount of boron compound in the brick can be increased until the content calculated as $B_2O_3$ is as high as 0.30%.

Excessive and unnecessary quantities of boron compound are to be avoided as such excessive quantities adversely affect the load-bearing properties of the brick at high temperature. It will be evident to refractory engineers that the boron compound should not bring in an element which will adversely affect the refractoriness of the brick, and therefore it is preferred not to use a borate of a metal whose oxide is not refractory.

In view of my invention and disclosure, variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention what I claim is new and desire to secure by Letters Patent is:

1. In producing basic refractory brick having resistance to cracking in the unburned condition, the art which includes mixing (1) refractory particles of the class consisting of magnesia, mixtures of at least 15% of magnesia with chrome ore making up the balance, mixtures of magnesia with 5% to 75% olivine, and mixtures of magnesia with 1% to 25% alumina, said magnesia being dead-burned and further being characterized by having the property of promoting cracking of ordinary basic refractory brick when molded wet with water and drying at temperatures short of mineralizing temperatures; (2) a crack-preventing material consisting essentially of a boron oxygen compound in a concentration of 0.02% to 0.30% calculated as $B_2O_3$, said percentages being by weight on a dry basis and said compound being a specific additive supplementing the composition of the particles; and (3) water; molding into brick at pressures in excess of about 5000 p.s.i. the mixture thus formed; and drying the brick at temperatures short of mineralizing temperatures in the presence of said refractory particles.

2. The process of claim 1, in which the boron compound is a boron oxide compound.

3. The process of claim 2, in which the boron compound is boric acid.

4. The process of claim 2, in which the boron compound is an alkaline earth boron oxide compound.

References Cited in the file of this patent

UNITED STATES PATENTS

| | | |
|---|---|---|
| 2,347,968 | Ross | May 2, 1944 |
| 2,671,732 | Birch et al. | Mar. 9, 1954 |
| 2,812,241 | Austin et al. | Nov. 5, 1957 |